Patented July 23, 1935

2,009,183

UNITED STATES PATENT OFFICE 2,009,183

DIFFICULTLY DISSOCIABLE ACYL DERIVATIVES OF SALICYLIC ACID AND PROCESS OF MAKING SAME

Hans Kaufmann, Munster/Westphalia, Germany

No Drawing. Application September 5, 1934, Serial No. 742,762. In Germany May 8, 1933

10 Claims. (Cl. 260—107)

This invention concerns a process for the preparation of difficultly dissociable acyl derivatives of salicylic acid and its derivatives.

The therapeutic use of the acyl derivative of salicylic acid is based on the theory that the dissociation of this medicament in the organism causes free acid to act thereon. The greater the ease of dissociation of the acyl residue the greater is the ease with which this idea can be carried into effect. The easier the dissociation of acetyl salicylic acid the smaller is the percentage of the substance left unchanged.

In contradistinction thereto the object of the present invention is the preparation of materials which are more stable than acetyl salicylic acid so that the molecule can more easily act as a whole. This higher stability is also useful from a practical point of view, because such materials are more durable and suitable for storage.

According to the process of the present invention difficultly dissociable acyl derivatives of salicylic acid or its derivatives are prepared by combining di-ethyl acetic acid or brom-di-ethyl acetic acid with salicylic acid or its esters by known methods.

The materials, di-ethylacetyl salicylic acid and brom-di-ethylacetyl salicylic acid thus obtained, have not hitherto been described in the literature. They can be obtained according to this invention by various known methods, such as by reacting salicyclic acid or sodium salicylate with the acid chlorides with or without the assistance of a hydrochloric acid-binding agent, or from salicylic acid and the anhydrides of the acids to be used for acylation. It is important to avoid an excess of salicylic acid since difficulties will otherwise be encountered in the crystallization. It is preferable to make use of the method of preparation from acid chlorides and salicylic acid in the presence of pyridine.

The properties of the new compounds thus obtained are described in detail in the examples. They fulfill the desideratum of being more difficultly saponifiable, which could not be foreseen. If, for example, equivalent amounts of the new acids are compared with acetyl salicylic acid with respect to their dissociation by N/10 soda lye, it will be found that the latter is completely dissociated in 5 minutes, whereas in the case of brom-di-ethylacetyl salicylic acid 2 hours are required and in the case of di-ethyl-salicylic acid as long as 8 hours are required. The new compounds can also if required be exposed for a long time to damp air, or be kept in tablet form, without any decomposition setting in.

From both of the aforementioned acids the corresponding salts can be obtained in known manner. While, as is known, acetyl salicylic acid does not produce a permanent sodium compound, di-ethylacetyl salicylic acid does produce such a compound. Organic bases also, such as quinine, give salts. If it is desired to prepare esters of the new compounds, the corresponding esters of salicylic acid are employed as starting materials.

The following examples illustrate how the process of the invention may be carried into effect:

1. 20 parts of di-ethylacetyl-chloride are slowly introduced into a solution containing 22 parts of salicylic acid in ether, to which pyridine has been added. After allowing it to stand for several hours, the product of the reaction is poured into ice-cold hydrochloric acid and the ether solution washed several times with water. After evaporating off the ether, the residue left behind is digested with warm water, or preferably with 20% alcohol, until the salicylic acid reaction disappears, the dry product is crystallized from petroleum ether. The di-ethylacetyl salicyclic acid thus obtained has a melting point of 55° C., is very difficultly soluble in water, but easily soluble in the usual organic solvents. About 30% dissolves in hot animal or vegetable oil and about 10% in cold animal or vegetable oil.

If the methyl alcohol solution of the new compound is shaken up with dry sodium carbonate and the solvent evaporated or removed with ether, the sodium salt of diethyl-acetyl salicylic acid is obtained; it is soluble in water and alcohol and insoluble in ether, acetone and chloroform. The calcium salt, which can be obtained in a similar manner, is, however, on the contrary difficultly soluble in water, more easily soluble in alcohol and benzene and readily soluble in acetone and chloroform.

If molecular quantities of di-ethylacetyl salicylic acid and quinine are dissolved in absolute alcohol, there remains, after the solvent has been removed by evaporation, the quinine salt of di-ethylacetyl salicylic acid in the form of a white powder. That a combination in molecular proportions of the components is produced can be proved by carrying out the experiments with the use of an excess of di-ethylacetyl salicylic acid. The latter can be washed out with a sufficient quantity of petroleum ether and the uniform compound remains behind.

2. 14 parts of salicylic acid dissolved in ether containing pyridine were reacted drop by drop with 21 parts of brom-di-ethylacetyl chloride.

After allowing the mixture to stand for some hours the pyridine or pyridine hydrochloride is removed by washing with water. The solution is dried and crystallized out. The brom-di-ethyl-acetyl salicylic acid which has a melting point of 88–89° C. is crystallized from petroleum ether. It is difficultly soluble in water but soluble in most organic solvents. Salts and compounds with organic bases can be produced in known manner.

3. 15 parts of salicylic acid methyl ester and 13 parts of di-ethylacetyl chloride are reacted together in solution in ether, preferably in the presence of pyridine. By working up the reaction product di-ethylacetyl salicylic acid methyl ester is produced, having a boiling point of 140–141° C. under a pressure of 3 mm. of mercury. The product is a colorless, oily, almost odorless liquid. In the same way the amyl ester can be produced as a water clear liquid having a boiling point of 180° C. under a pressure of 3 mm. of mercury.

4. Following the method of Example 3, 15 parts of salicylic acid methyl ester and 21 parts of brom-di-ethylacetyl chloride were reacted to produce brom-di-ethylacetyl salicylic acid methyl ester. It distils under a 3 mm. vacuum at 175° C., as a colorless, faintly odorous liquid.

Generalizing the above, it will be seen that the substances involved in the present case may be expressed in symbols by the following formulas, denoting acyl derivatives of salicylic acid:

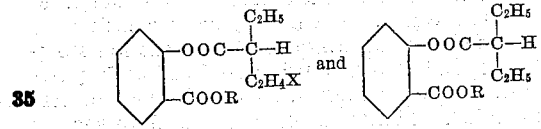 and 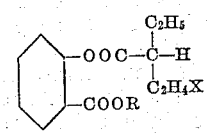

wherein X represents hydrogen or bromine and R represents hydrogen, a lower alkyl or an alkali-forming metal.

I claim:

1. A process for the production of difficultly dissociable acyl derivatives of salicylic acid comprising reacting a substance selected from the group consisting of di-ethyl acetic acid, brom-di-ethyl acetic acids, di-ethyl acetyl chloride, di-ethyl acetic acid anhydride, brom-di-ethyl acetyl chloride and brom-di-ethyl acetic acid anhydride with a substance selected from the group consisting of salicylic acid, salicylic acid esters and salicylic acid salts.

2. A process for the production of difficultly dissociable acyl derivatives of salicylic acid comprising reacting a substance selected from the group consisting of di-ethyl acetic acid, brom-di-ethyl acetic acid, di-ethylacetyl chloride, di-ethyl acetic acid anhydride, brom-di-ethylacetyl chloride and brom-di-ethyl acetic acid anhydride with a substance selected from the group consisting of salicylic acid, salicylic acid esters and salicylic acid salts in the presence of an acid-neutralizing agent.

3. A process for the production of difficultly dissociable acyl derivatives of salicylic acid comprising reacting a susbtance selected from the group consisting of di-ethyl acetic acid, brom-di-ethyl acetic acid, di-ethylacetyl chloride, di-ethyl acetic acid anhydride, brom-di-ethylacetyl chloride and brom-di-ethyl acetic acid anhydride with a substance selected from the group consisting of salicylic acid, salicylic acid esters and salicylic acid salts in the presence of pyridine.

4. Di-ethylacetyl salicylic acid.

5. An ester of di-ethylacetyl salicylic acid.

6. A salt of di-ethylacetyl salicylic acid.

7. Di-ethylacetyl salicylic acid methyl ester.

8. The sodium salt of di-ethylacetyl salicylic acid.

9. A compound having the general formula

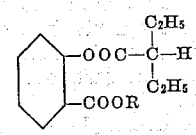

wherein X represents hydrogen or bromine and R represents hydrogen, a lower alkyl or an alkali-forming metal.

10. A compound having the general formula wherein R represents hydrogen, a lower alkyl or an alkali-forming metal.

HANS KAUFMANN.